Sept. 15, 1936. M. STRINGER 2,054,306
FISHING REEL
Filed Dec. 26, 1934
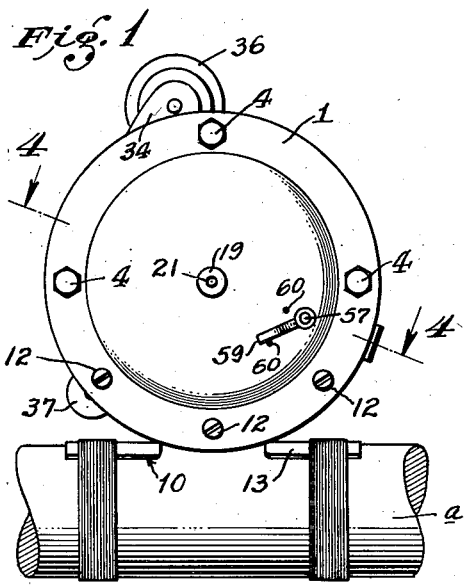
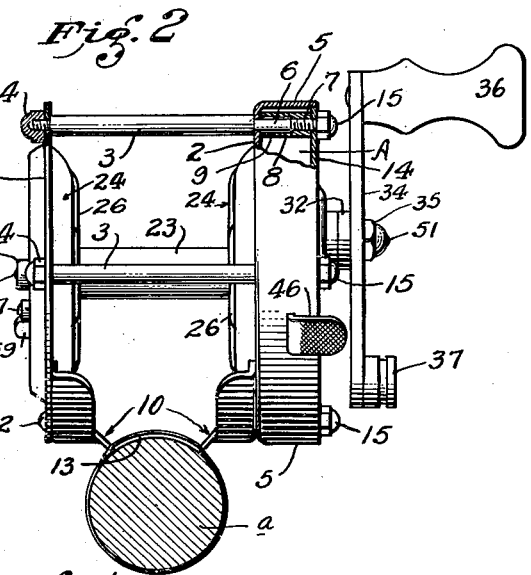
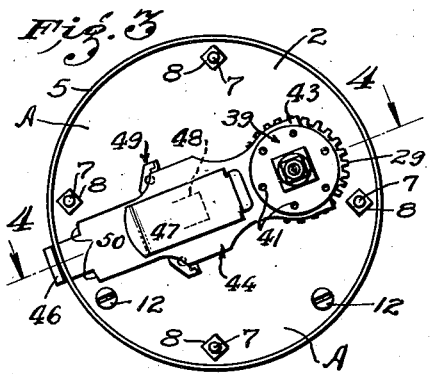
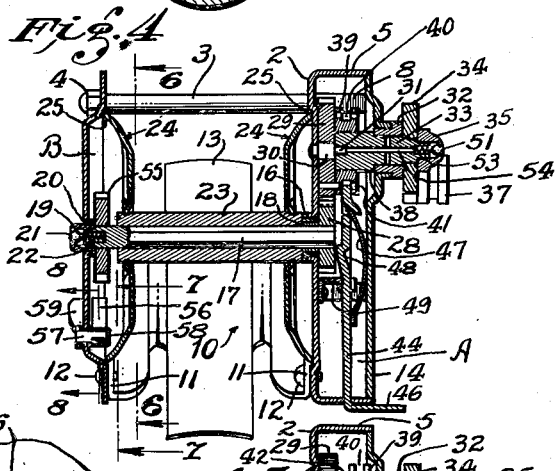
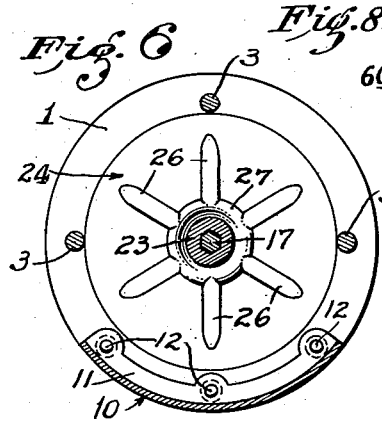
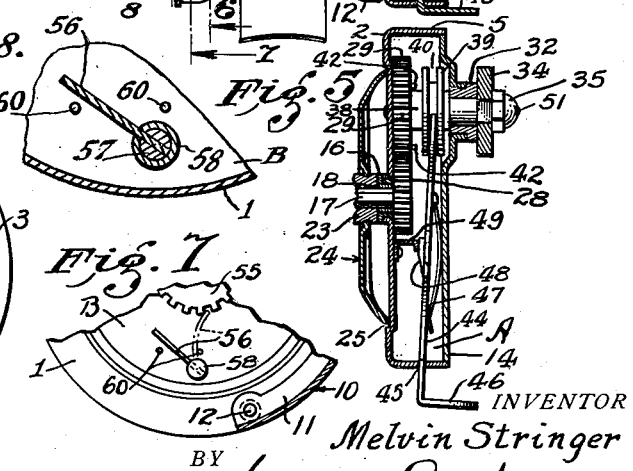
INVENTOR
Melvin Stringer
BY
his ATTORNEY Patented Sept. 15, 1936

2,054,306

UNITED STATES PATENT OFFICE 2,054,306

FISHING REEL

Melvin Stringer, Pasadena, Calif.

Application December 26, 1934, Serial No. 759,134

7 Claims. (Cl. 242—84.7)

My invention relates to fishing reels and particularly to the type of reel known as a free spool fishing reel.

An object of my invention is to provide a novel free spooling mechanism for a fishing reel that is entirely housed at one end of the reel in such a manner that such mechanism may be disassembled and reassembled without disturbing the alinement of the spool in its bearings.

Another object is to provide a novel fishing reel in which the driving mechanism therefor may be easily and quickly assembled by unskilled persons.

Another object is to provide a novel spool construction for a fishing reel which is so arranged as to facilitate the drainage of water from the line as well as the circulation of air for drying the line when wound on the spool.

Another object is to provide a novel and simple click arrangement which is automatic in its action; that is, the click arrangement is automatically rendered inoperative upon winding in, on the reel.

Another object is to provide on the whole a novel fishing reel in which the parts are particularly simple and economical of manufacture as well as durable and sturdy of construction, many of the parts being so arranged as to be stamped from sheet material.

Another object is to provide a fishing reel which incorporates a simple yet effective means of lubricating the moving parts.

A still further object is to provide a novel fishing reel that does not require an adjustable end thrust bearing.

Other objects, advantages, and features of invention may appear from the accompanying drawing, the subjoined detail description and the appended claims.

The accompanying drawing illustrates the invention in the form I at present deem preferable.

Figure 1 is an end elevational view of my novel fishing reel shown in position on a fishing rod a fragment of which is shown.

Fig. 2 is a side elevational view thereof with parts and portions broken away and in section to facilitate the illustration.

Fig. 3 is an end elevational view taken from the end opposite to that of Fig. 1 with the cover and handle removed showing the clutch mechanism in its engaged position.

Fig. 4 is a sectional view along the axis of the spool taken on line 4—4, Fig. 1, with parts and portions shown in elevation and also with the clutch mechanism shown in its engaged position.

Fig. 5 is a similar sectional view of one end of the reel showing the clutch mechanism in its disengaged position.

Fig. 6 is a transverse sectional view on line 6—6, Fig. 4, showing particularly the spool flange.

Fig. 7 is a fragmentary sectional view on line 7—7, Fig. 4, showing the click spring in its disengaged position in solid lines, and in its engaged position by dotted lines.

Fig. 8 is a similar fragmentary sectional view on line 8—8, Fig. 4, illustrating the manner of securing the click spring to the operating handle therefor.

A pair of end plates 1 and 2 of generally circular form are held in spaced parallel relation by a plurality of spacer bars 3 and are adapted to be stamped from sheet material. Each spacer bar protrudes through plate 1 and is reduced and threaded to receive a nut 4. The other plate 2 is provided with an axially outwardly directed peripheral skirt 5 so as to form a housing, designated A, for the driving and clutch mechanisms to be described hereinafter.

The end portions 6 of several spacer bars 3 are reduced in section to form abutment shoulders for the plate 2 and protrude beyond the skirt 5. The outer part of the reduced portions 6 are threaded as at 7 to receive spacer nuts 8 as shown best in Fig. 2. Each spacer nut is square in cross section and slightly shorter than the skirt 5. The nuts 8 connect the plate 2 rigidly to the spacer bars 3. In order to reduce the extent of the threaded portions 7, the several spacer nuts 8 are relieved at their inner portions as indicated by 9.

In addition to the spacer bars 3, the plates 1 and 2 are connected at their lower sides by a supporting bracket means 10. Said bracket means comprises two arcuate portions which are L shaped in cross section to form radially directed flanges 11. Said flanges are secured by screws 12 to the plates 1 and 2. One of the screws is provided with a shank similar to the end portions 6 of the spacer bar 3 to receive a spacer nut 8. The axially directed leg of each flange 11 joins opposite sides of semi-cylindrical securing portions 13 which are adapted to be bound to a fishing rod a as shown in Figs. 1 and 2. The bracket means, it will be noted, is so formed as to permit its construction from sheet material.

In order to enclose the housing A formed by the plate 2 and skirt 5, a cover member 14 is provided which fits snugly within the skirt 5 and is spaced from the bottom of the housing or plate 2 by the spacer nuts 8. The cover member is secured by nuts 15 which fit the ends of the spacer rods 3.

The plate 2 is provided with a centered aperture therethrough which receives a bushing or bearing 16. A polygonal shaped rod 17 extends through the bearing 16 and is provided with a journal collar 18 which fits the bearing. The opposite end of the rod 17 is reduced in section and made circular to receive a cup shaped journal member 19 which is press fitted into an aperture 20 centered in the plate 1. The journal member 19 is exposed and provided with a small aperture adapted to be closed by a ball check 21 urged to a sealing position by a spring 22 which extends into a recess formed in the end of the rod 17 as shown best in Fig. 4. The ball check 21, spring 22 and aperture in the journal member form a means for admitting lubricant to the reduced circular portion of rod 17 that is journaled in member 19.

Between the plates 1 and 2, the rod 17 is provided with a spool hub member 23 which is secured to the rod 17. To the end portions of the hub are press fitted spool flanges 24 formed of sheet material. The peripheral portions of the flanges 24 curve axially outwardly and fit into a slight recess 25 formed in the plates 1 and 2 to prevent the fishing line from passing outside the spool. The spool flanges 24 are provided on their axially inner sides with a plurality of radiating ribs 26 as shown best in Fig. 6, which join at their inner ends to a circular rib 27. The purpose of the ribs 26 and 27 is to space the line, not shown, but which is to wind on the spool from the flanges 24 and form spaces for the drainage of water and the circulation of air for drying the line when the wet line is wound upon the spool.

The end of the shaft 17 protruding into the housing A receives a gear 28 which meshes with another gear 29. The gear 29 is journaled on a stub shaft 30 riveted or otherwise secured to the plate 2. Said shaft 30 is provided with a coaxial journal pin 31 which extends beyond the gear 29.

The cover member 14 is provided with an aperture in axial alinement with the shaft 30 which aperture is fitted with a bearing member 32. A drive shaft 33 is provided with a journal portion which fits bearing member 32 and a socket which fits the journal pin 31. Outwardly of the bearing member 32 is a polygonal portion of reduced section which receives a crank arm 34. Said crank arm is held in place by a cap nut 35. The crank arm 34 is flat and extends both ways from the shaft 33 and is provided at one end with a handle 36 and at the opposite end with a counterweight 37.

Between the bearing 32 and journal pin 31 the drive shaft 33 is provided with a polygonal portion designated 38 of increased cross section which slidably receives a clutch member 39. Said clutch member 39 is provided with a circular, peripheral channel 40 and is pierced axially adjacent its periphery with apertures 41. In the construction illustrated, see Fig. 3, six of such apertures are provided. The gear 29, which is in axial alinement with the clutch member 39, is provided, in the present construction, with three equi-spaced pins 42 which fit part way into three of the six apertures 41. By reversing the side of the clutch member 39 facing the gear 29 different sets of apertures 41 may be presented to the pins 42 as the apertures become worn.

The peripheral channel 40 of the clutch member is adapted to receive the forked end 43 of a shifting lever 44. Said lever is in the form of a relatively flat, wide bar formed of sheet metal and which extends from the clutch member diametrically across the housing A and protrudes through a slot 45 provided in the skirt 5. The protruding end 46 of the lever 44 is bent axially outwardly to form a finger grip surface. Opposite the intermediate portion of the lever on the side facing the cover member 14 is a leaf spring 47 one end of which is anchored in the lever by extruding a slot therein, inserting the spring 47 and pressing the extruded portion to clamp the spring, as shown best in Figs. 3 and 4. Also extruded from the lever in substantially centered relation with the spring 47 is a cam portion 48. Said cam portion is adapted to ride on a combined bracket and guide means 49 secured to the plate 2 and extending axially outwardly therefrom to engage the edges of the lever as shown in Fig. 3 and to be engaged by the cam portion 48 thereof, as shown in Figs. 4 and 5. The protruding portion 46 of the lever is reduced in section forming with the main portion of the lever, shoulders 50, as shown in Fig. 3, which shoulders limit the outward movement of the lever. As the lever moves from its inner to its outer position, the cam portion 48 rides on the bracket 49 causing the lever to fulcrum at the slot 45 and thereby to shift the forked end 43 of the lever axially outward; that is, from the position shown in Fig. 4 to the position shown in Fig. 5. When the lever is positioned as shown in Fig. 5, the clutch member is positively held in disengaged relation with the gear wheel 29.

It should be noted that to disassemble or repair the driving mechanism or clutch mechanism, it is only necessary to remove the four nuts 15. Then, while the plates 1 and 2 are still held in their proper relationship and the alinement of the spool is not disturbed, the various parts may be removed or replaced without the requirement of any tools whatsoever, but may be picked up and removed or replaced by hand.

In order to lubricate the moving parts of the drive mechanism and clutch mechanism the cap nut 35 is provided with an aperture which is sealed by a ball check 51 backed by a spring 53. Passages 54 lead from the nut 35 to the journal pin 31 and to the bearing member 32, as shown in Fig. 4. From the end of the shaft 33 the lubricant passes around the stub shaft 30 and down along and around the gears 29 and 28 to lubricate the bearing 16. Some lubricant, of course, tends to pass between the shaft 33 and gear 29 to lubricate the clutch member 39.

Inwardly of the spool flange recess 25 of the end plate 1, said plate is dished outwardly to form with said spool flange a housing B.

A ratchet wheel 55 is secured to the end of the rod 17 protruding into the housing B. Said ratchet wheel 55 is adapted to be engaged by a click spring 56 journaled radially outwardly of the ratchet wheel. For this purpose, an aperture is provided in the plate 1 through which extends a pin 57. The inner end of the pin is slotted, as shown in Figs. 4 and 8, to receive the spring 56 and receives a press fitted cap 58 slotted on one side only to permit the spring to extend therethrough. The outer end of the pin 57 receives a thumb lever 59. Stop pins 60 limit the movement of the lever and spring. Both the lever and spring 56 are positioned so that they tend to fall by gravity away from the ratchet wheel 55, once they are clear thereof after being moved to clearing position by the reverse movement of the ratchet wheel 55, which is occasioned by a "winding-in" operation of the spool.

From the foregoing it will be seen that the inner end of the bearing member 19 engages the ratchet wheel 55 which is press fitted onto rod 17 and the bearing member 16 is press fitted into the aperture formed in plate 2 that receives such bearing 16 and the inner end of the bearing 16 engages the end of spool 23 thereby forming a predetermined distance between bearing 16 and bearing member 19 so that an end-thrust bearing is not required.

I claim:

1. In a fishing reel; a pair of end plates; spacer bars for connecting said end plates; one of said end plates being cup shaped with an axially outwardly directed skirt; spacer nuts within said skirt for securing said plate to said spacer bars; a cover member arranged to rest on said spacer nuts and be held thereby in spaced relation with said plate to form therewith a housing; and driving mechanism for said spool mounted in said housing and accessible upon removal of said cover member.

2. In a fishing reel; a pair of end plates; spacer bars for connecting said end plates; one of said end plates being cup shaped with an axially outwardly directed skirt; spacer nuts within said skirt for securing said plate to said spacer bars; a cover member arranged to rest on said spacer nuts and be held thereby in spaced relation with said plate to form therewith a housing; driving mechanism for said spool mounted in said housing and accessible upon removal of said cover member; and a clutch mechanism interposed in said driving mechanism and also accessible upon removal of said cover member.

3. In a fishing reel; a driving mechanism comprising, a gear transmission; a shaft for driving one of the gears of said transmission; a clutch member slidably but non-revolubly mounted on said shaft; coacting clutch elements in said member and said gear and a slidably and pivotally mounted lever for operating said clutch member.

4. The combination with a fishing reel frame and spool journaled thereby; of a housing incorporating said frame in part; cover means providing access to said housing independently of said frame whereby the frame and spool may be maintained intact; driving mechanism for said spool mounted in said housing and entirely accessible upon removal of said cover means; said driving mechanism comprising, a gear transmission, a shaft for driving one of the gears of said transmission, a clutch member slidably but non-revolubly mounted on said shaft, coacting clutch elements in said member and said gear; and a slidably and pivotably mounted lever for operating said clutch member.

5. The combination with a fishing reel frame having a housing at one end and arranged to receive a spool; of a spool driving mechanism mounted in said housing and comprising, a gear transmission, a driving shaft therefor arranged coaxially with one of the gears of said transmission and protruding from the housing, a clutch member slidably but non-revolubly mounted on said shaft, coacting clutch elements in said clutch member and said gear; operating means for said clutch member slidably mounted in said housing in radial relation with said clutch member and having an end protruding from said housing; and a device for causing lateral displacement of the end of said means engaging said clutch member upon sliding movement thereof.

6. The combination with a fishing reel frame having a housing at one end and arranged to receive a spool; a driving mechanism mounted in said housing; a clutch mechanism interposed in said driving mechanism; and an operating means for said clutch mechanism comprising, an arm engaging said clutch mechanism and extending radially therefrom through an aperture in said housing, a bracket extending from a wall of said housing, a spring arranged to urge said arm against said bracket, cam means incorporated in said arm and engageable by said bracket to shift the operating end thereof and actuate said clutch mechanism upon radial movement of said arm.

7. In a fishing reel; a pair of end frame means; connecting members rigidly securing said frame means in spaced apart relation; a spool journaled between said frame means; a cover member arranged to form with one of said frame means a housing; means for securing said cover member to its frame means independently of the connection between said frame means whereby the cover member is removable without disturbing said connection; driving mechanism for said spool mounted in said housing and accessible upon removal of said cover member; and an operating means for said clutch mechanism comprising, an arm engaging said clutch mechanism and extending radially therefrom through an aperture in said housing; a bracket extending from a wall of said housing, a spring arranged to urge said arm against said bracket; and cam means incorporated in said arm and engageable by said bracket to shift the operating end thereof and actuate said clutch mechanism upon radial movement of said arm.

MELVIN STRINGER.